UNITED STATES PATENT OFFICE.

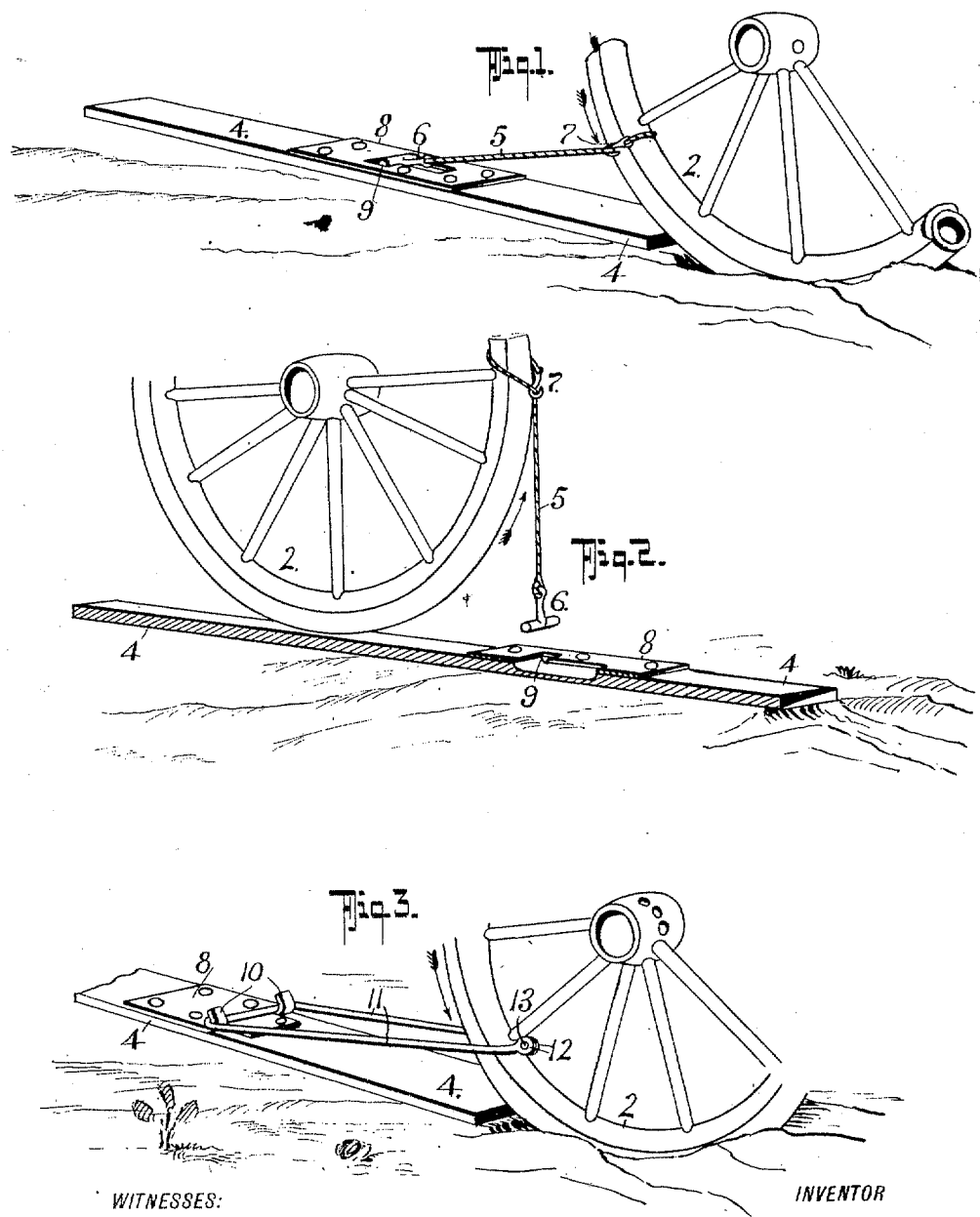

GEORGE SPRUNG, OF VANCOUVER, BRITISH COLUMBIA, CANADA.

AUTOMOBILE WHEEL-HELP.

986,099.  Specification of Letters Patent.  Patented Mar. 7, 1911.

Application filed January 4, 1910. Serial No. 536,412.

*To all whom it may concern:*

Be it known that I, GEORGE SPRUNG, a citizen of the Dominion of Canada, residing at Vancouver, in the Province of British Columbia, Canada, have invented a new and useful Automobile Wheel-Help, of which the following is a specification.

This invention relates to a device for enabling any self-propelled vehicle to extricate itself out of a hole in soft ground into which it may have worked.

When an auto vehicle becomes mired, so soon as it is found that it cannot withdraw itself, attempt is made to assist it by putting down a board or plank that not only prevents the wheel sinking farther into the mud but enables it to roll upward out of the hole which it has formed. In this operation difficulty is frequently experienced in that the wheel will not roll onto the board but will continue to rotate in the soft ground independent of it. This difficulty I overcome in the invention which is the subject of this application by providing a means for connecting a board or short length of track to the wheel, so that the wheel is compelled to roll forward and will tend to draw the board under it, and that when the wheel has passed over the point of attachment and may be presumed to have surmounted the obstacle, will automatically release itself from the attachment.

The invention is particularly described in the following specification, reference being made to the drawings by which it is accompanied, in which:

Figure 1 shows in perspective a mired wheel with the attachment made to the relieving device, Fig. 2, a similar view of the wheel as having surmounted the soft place and as having just released itself from the attachment, which is shown in part section, Fig. 3 is a similar view showing a modified form of the connection.

In these drawings 2 represents the driving wheel of a self-propelled vehicle and 4 is a short length of board or other material which it is desired to pass under the wheel as a track to enable the wheel to extricate itself. The board 4 is flexibly connected to the wheel in any suitable manner that will automatically release, when the wheel has passed over the place of attachment of it to the board.

Figs. 1 and 2 show a simple means by which this attachment may be made by a short length 5 of chain or wire rope, one end of which is provided with a T 6 that can be dropped into a correspondingly shaped slot 9 in a plate 8 secured to the board and forming a retaining groove therewith, and the other end is provided with a hook 7 which, when that end of the connection is passed around the rim of the wheel behind one of the spokes, may be hooked onto the chain or rope in the manner shown.

The groove behind the slot of the plate 8 is such that the T end 6 will retain its engagement with the board 4 when pulled toward the wheel from the front, but as shown in Fig. 2, will readily withdraw itself from the groove when the wheel has passed over it, and it is drawn upward and backward toward the wheel from behind: Thus, when the wheel rotates in the direction of the arrow, it will draw the board tightly under the wheel and will roll itself up onto it, but when in its further movement it has passed over the groove the T end will be drawn out of the slot and the connection released.

Fig. 3 shows an alternative construction where hooks 10 are secured to the board 4 on each side of the tread, and a stirrup iron 11 provided with eyes 12 at the open end through which eyes a connecting pin 13 may be passed between the spokes. The closed end of the stirrup 11 is placed in the hooks 10 of the board and the same action takes place as before described when the wheel rotates.

Although the track section 4 has been described as a board it will be obvious that it may be made of light metal having flanged edges in which notches may be cut for the reception of the closed end of the stirrup; the essential feature of the invention being the provision of a short section of track flexibly connected to the driving wheel of the vehicle.

Having now particularly described my invention and the manner of its use, I hereby declare that what I claim as new and desire to be protected in by Letters Patent, is:

1. In a device of the class described, the combination with a driving wheel of a self-propelled vehicle, of a short section of track, means for flexibly connecting it to the wheel and means for automatically releasing the flexible connection from the track length as said wheel rolls toward one end of said track.

2. In a device of the class described, the combination with a driving wheel of a self-propelled vehicle, of a short section of track, a releasable flexible connection between said wheel and said track, said connection including a cable securable to said wheel, a T at one end of said cable, said track section having a notch to receive said T, and a hook at the other end of said cable.

3. The combination with the driving wheel of an auto, of a short track section and means for flexibly connecting the track section to the wheel said connection being such that the rotation of the wheel will hold it in engagement with said track section until after the wheel has passed over the point of attachment but that further rotation will release said connecting means from such engagement.

4. In a device of the class described, the combination with a driving wheel of a self-propelled vehicle, of a short section of track, a pull device connected to said wheel and releasably connected to said track section in virtue of which as said wheel turns it will ride up on said track section and roll toward one end thereof, said pull device automatically disengaging said track section as said wheel rolls toward one end of the said track and passes the place where said pull device is connected to said track section.

In testimony whereof I have signed my name to this specification in the presence of two subscribing witnesses.

GEORGE SPRUNG.

Witnesses:
ROWLAND BRITTAIN,
ALEXANDER SMITH.